Figure 1:
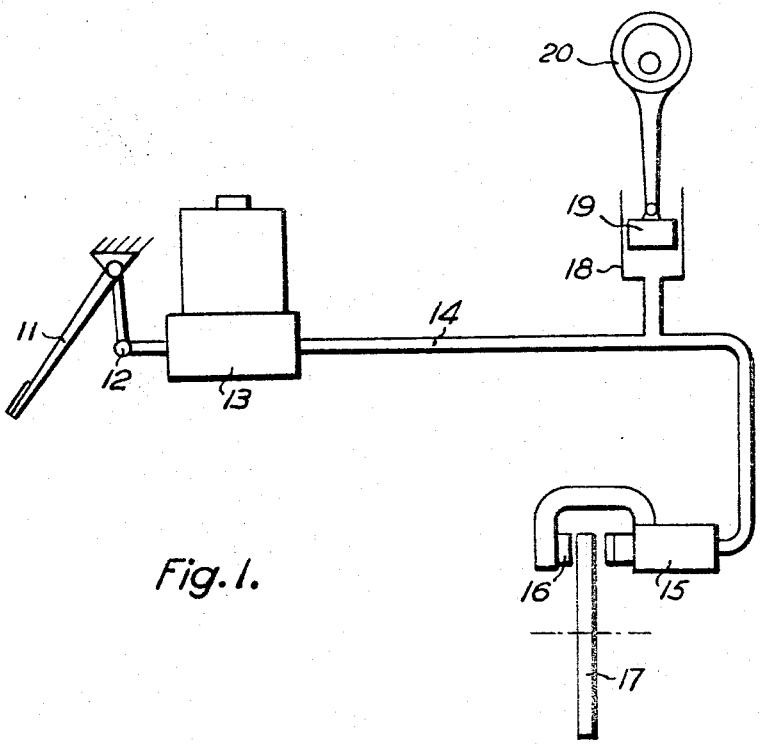

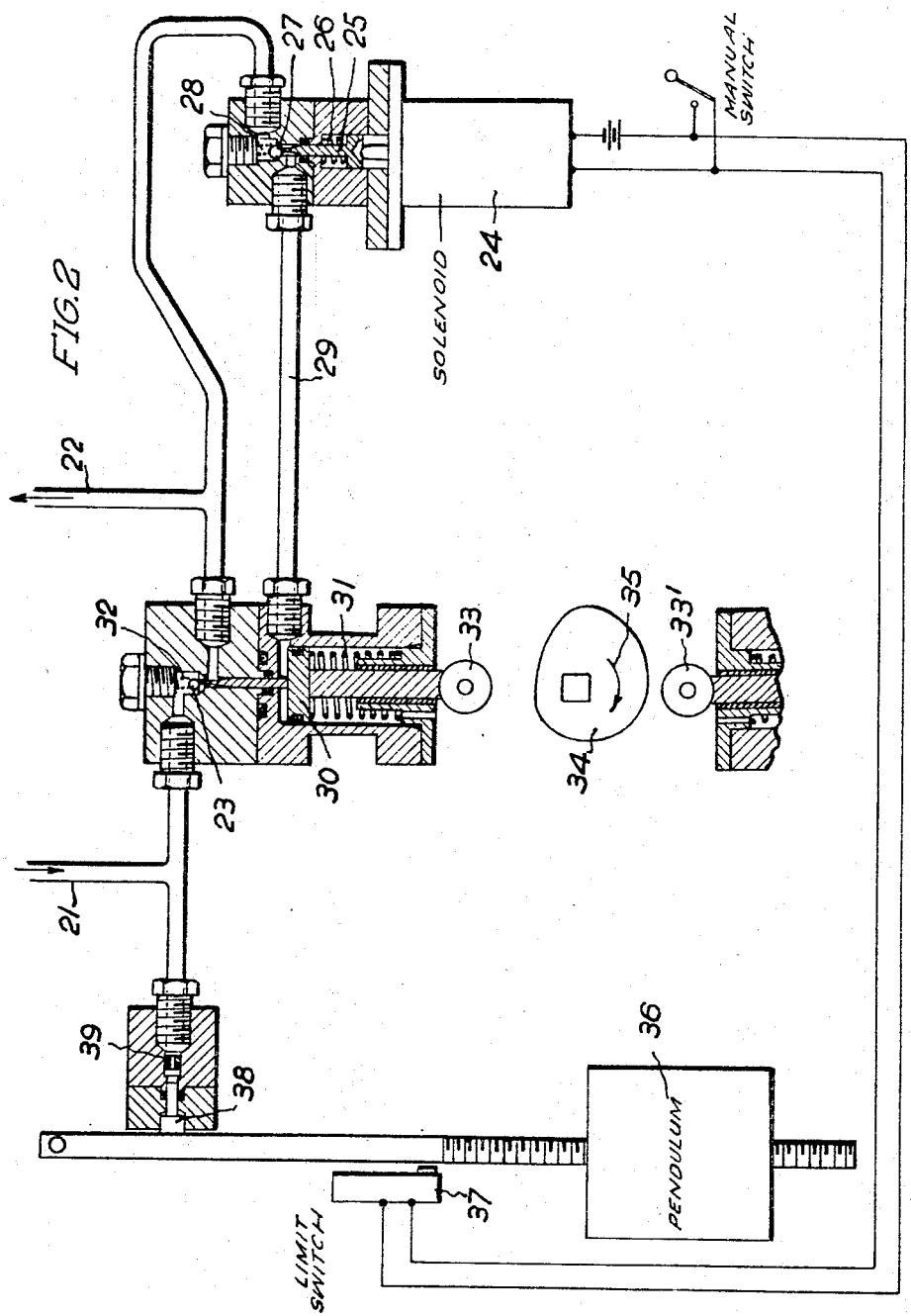

United States Patent Office 3,276,822
Patented Oct. 4, 1966

3,276,822
BRAKING OF MOTOR VEHICLES
Robert Duncan Lister and Richard Norman Kemp, Slough, Buckinghamshire, and Henry Alexander Wilkins, Wokingham, Berkshire, England, assignors to National Research Development Corporation, London, England
Filed June 22, 1964, Ser. No. 376,962
Claims priority, application Great Britain, June 26, 1963, 25,488/63
4 Claims. (Cl. 303—24)

This invention relates to hydraulic brakes of motor vehicles.

It has been shown that on slippery surfaces when the road wheels become locked with low applied brake pressure, the best results are obtained by "pumping" that is applying the brakes with a pressure sufficient for all the wheels to lock, releasing, and reapplying, this alternate application and release being continued as rapidly as possible until the vehicle comes to rest. Pumping requires skill and cannot be effected as rapidly as might be desirable and it has been suggested that it might be possible to obtain better results by using an automatic method of pumping the brakes at a faster and more regular rate than can be achieved by a driver without any aid.

An object of the invention is to provide such aid without undue elaboration with consequent expense and possible lack of reliability. The system according to the invention comprises generally hydraulic brake actuating means, hydraulic master cylinder means, a brake pedal connected to actuate the cylinder means, a pipe line coupling the cylinder means and the actuating means, and selectively operable means connected to the pipe line to cause the hydraulic pressure therein to pulsate, system control means comprising deceleration responsive means responsive also to the degree of hydraulic pressure in the pipe line when the braking system is operated to operate the selectively operable means under conditions of heavy braking without correspondingly rapid deceleration. The system preferably includes a pump device for producing pulsations in the hydraulic pressure applied to the brakes and actuated from a power driven source but which when there is no pressure in the hydraulic line is returned by a spring or the like to a position in which it is uncoupled from the power source and in this position opens a valve in the hydraulic line, while a control valve is included between a point downstream of the aforesaid line valve and the pumping space of the pump device, this control valve being biased to the closed position and being opened when the system is to be put into operation.

When there is pressure in the hydraulic line and the control valve is opened, pressure reaches the pumping space, the pumping device is displaced against the return spring or the like to allow the line valve to close and itself to become coupled to the power source which actuates the pumping device to produce pulsations in the pressure applied to the brakes. The line valve being closed prevents these pulsations from reacting on the master cylinder which is upstream of this valve, and the pressure pulsations are derived from the power source.

While the control valve is closed the line pressure does not have access to the pumping space of the pumping device so that the line valve remains open and the brakes can be applied in the normal way.

The pumping device does not have actually to pump liquid and it therefore does not require inlet or delivery valves of its own. It can be a simple piston device returned by a spring and having a stem which in its returned position pushes the line valve off its seating. The line valve may be a ball biased to close by a light spring.

The power source may be the vehicle engine, a flywheel brought to speed by the engine through a free wheel, or an electric motor switched on at the same time as the control valve is opened. Any of these power sources may actuate the piston by a cam rotated at an appropriate speed and into the path of which a cam follower on the piston may be brought when line pressure is admitted to the pumping space and displaces the piston against the return spring.

There may be separate pumping devices for each brake or desired combinations for example for front wheel brakes and rear wheel brakes respectively or for near side and off side respectively and a single cam could operate all or both, in any desired phase relationship.

The control valve again may be a spring biased ball and it may be opened by a projection on the core of a solenoid which is excited to bring the system into action.

The solenoid switch may be controlled by a pendulum or like device set to respond to the acceleration of the vehicle in its direction of travel. For example a piston actuated by the line pressure may urge the pendulum in the opposite direction to the deceleration forces. At a sufficiently high line pressure in relation to the deceleration forces generated in the pendulum the line pressure will displace the pendulum far enough to actuate a micro-switch serving as the solenoid switch, so setting the pulsating device in action. Up to the value of line pressure at which this overcomes the decelerating forces generated in the pendulum normal slowing down occurs and the device does not come into action.

Similar action takes place if there is a sudden drop in deceleration, such as when the braking changes from the locking imminent to the locked wheel condition. The deceleration forces on the pendulum are reduced and it will drop back and actuate the micro-switch, bringing the device into action. Such dropping back would if followed by the piston increase the clearance volume behind the piston. To hinder sudden changes in the line pressure from being produced in this way there may be a hydraulic throttle between the space immediately behind this piston and a branch pipe from the hydraulic line.

The micro-switch may be arranged to be closed by the pendulum when it moves in the opposite direction to the deceleration forces or it may be of the type which closes when released, in which case it will be disposed on the opposite side of the pendulum so as normally to be in contact therewith.

Instead of a solenoid any other convenient remote control system may be used to open the control valve for example hydraulic or pneumatic with a valve instead of a switch. Or again the pedal or pendulum may be arranged directly to push the control valve off its seating to open it.

In order that the invention may be clearly understood some embodiments thereof will now be described by way of example only with reference to the accompanying diagrammatic drawings in which, FIGURE 1 is a diagrammatic drawing showing the essentials of the basic system to which the invention is applicable, and FIGURE 2 is a diagrammatic illustration of a preferred practical arrangement according to the invention.

In the arrangement shown in FIGURE 1 a pivotally mounted brake pedal 11 is connected by means of a mechanical linkage 12 to the brake master cylinder 13. The master cylinder is connected by means of a hydraulic pipe line 14 to a brake cylinder 15 to close the brake pads 16 on to a brake disc 17. Thus far the brake arrangement is quite conventional. The brake line 14 is connected to a cylinder 18 containing a piston 19 which can be oscillated by means of an eccentric 20. If arrangements are provided whereby the cylinder 18 is connected to the brake line 14 or the eccentric 20 is rotated at a point when it is desired to avoid wheel locking then at this point pulsations in the hydraulic system caused by oscillation of piston 19 will cause the brakes to be applied and released at a high repetition rate which is governed by the speed of rotation of the eccentric 20. This will be equivalent to a very rapid pumping action of the brake pedal.

In the arrangement shown in FIGURE 2 the pipe line 21 carries hydraulic fluid from the master cylinder and the pipe line 22 is connected to the vehicle brakes, the pipe lines 21 and 22 thus being the equivalent of that section of pipe line 14 of FIGURE 1 which includes the junction of line 14 to the piston and cylinder arrangement 19, 18. The parts shown in the drawing are shown in the position with the brakes off. If the brake pedal controlling the master cylinder connected to pipe line 21 is then depressed gently to produce a slight braking action then pressure is transmitted through the pipe line 21 and through the open valve 23 to the line 22 and thus to the brakes connected to line 22.

Thus under these conditions the brakes operate in the normal manner. Movement of the brake pedal past a limiting position could operate a switch which will energise the solenoid 24 to move the plunger 25 against the bias of the spring 26 to lift the ball 27 off its seating against the bias of the spring 28. This allows hydraulic fluid to pass through the line 29 into the space above the piston 30. This piston 30 is thereby moved downwardly as shown in the drawings against the bias of the spring 31 and when the piston has moved a certain distance the ball 23 engages its seating under the bias of the spring 32 and is held there by the continuing pressure upon the brake pedal. At the same time the roller 33 carried by the piston 30 is moved into such a position that it is engaged by the cam 34 which is rotating in the direction shown by the arrow 35. The rotation of the cam then produces an oscillating movement of the piston 30 which causes the brakes to be applied and released at the same frequency as the speed of rotation of the cam. This effectively produces a rapid pumping action of the brakes. When the brake pedal is released the ball 27 is urged towards its seating by the spring 28 and it then acts as a non return valve so that the piston 30 when raised either by the cam 34 or the spring 31 remains in the raised position. This in turn opens the valve 23 and retains it in the open position.

Whilst upon certain occasions it is quite satisfactory to arrange that the solenoid is energised by a switch being closed when the brake pedal has moved a predetermined distance, it is preferred in accordance with the invention that the pumping action should be initiated by a change in the deceleration of the vehicle. To this end and in accordance with the invention a pendulum 36 is mounted so as to be responsive to deceleration of the vehicle in a direction away from a limit switch 37 and towards a further piston 38 connected to line 21 so as to be actuated by the hydraulic system. To prevent sudden changes in line pressure in line 21 from being produced in the braking system by sudden changes in the volume of the space behind the piston 38 this is connected to pipe line 21 by means of a throttling aperture 39.

Thus when heavy braking is effected the increase in pressure in line 21 causes piston 38 to tend to move pendulum 36 towards limit switch 37 to operate the latter and bring about energisation of solenoid 24. As long as this braking produces corresponding deceleration of the vehicle pendulum 36 opposes the tendency of piston 38 to move it and switch 37 is not operated. If the wheels should lock this opposition will be reduced and switch 37 will be operated.

Thus the pulsation of pressure in line 22 is automatically brought into operation in response to wheel locking.

The arangement can be made solely dependent upon deceleration by omitting piston 38 so that upon reduction in deceleration pendulum 36 swings back into contact with limit switch 37 to operate the latter.

It will be appreciated that it may be desirable to provide a separate pumping action for each brake or for desired combinations of brakes and in this case the cam 34 may be arranged to engage at least one other roller 33' connected to a similar apparatus to that described.

What we claim is:

1. In a vehicle hydraulic braking system which comprises hydraulic brake actuating means, hydraulic master cylinder means, a brake pedal connected to actuate said cylinder means, a pipe line coupling said cylinder means and said actuating means, and selectively operable means connected to said pipe line to cause the hydraulic pressure therein to pulsate, system control means comprising deceleration responsive means responsive to the degree of hydraulic pressure in said pipe line when said braking system is operated to operate said selectively operable means under conditions of heavy braking without correspondingly rapid deceleration.

2. A vehicle hydraulic braking system comprising a movable brake operating member, a hydraulic master cylinder connected to generate hydraulic pressure in accordance with the extent of movement of said operating member, hydraulic brake means, a pipe line coupling said brake means to said cylinder for the application of said hydraulic pressure to said brake means to cause operation thereof, selectively operable pressure pulsation generating means coupled to said pipe line, deceleration responsive means having an element movable in a first direction in response to deceleration forces acting on said vehicle, means responsive to the hydraulic pressure in said pipe line to move said element of said deceleration responsive means in a second direction opposite to said first direction, and means responsive to said movable element being moved in said second direction to a predetermined extent to operate said selectively operable pressure pulsation generating means to cause the pressure in said pipe line to pulsate rapidly and bring about intermittent application of braking force by said brake means.

3. A vehicle hydraulic braking system in accordance with claim 2 wherein said pressure pulsation means is selectively operable in dependence upon the energisation and de-energisation of the energising circuit of a solenoid means, and said means responsive to the extent of movement of said movable element comprises an electric switch connected in the energisation circuit of said solenoid means.

4. A vehicle hydraulic braking system in accordance with claim 2 wherein said pressure pulsation means comprises a continuously rotating eccentric cam means, and piston means arranged to be moved selectively into and out of engagement with said cam means, said piston means being arranged to operate in a hydraulic cylinder selectively in communication with said pipe line whereby to pulsate the pressure in said pipe line when moved into engagement with said cam means, and wherein a solenoid controlled hydraulic valve is connected between said hydraulic cylinder and said pipe line to selectively apply the pressure in said pipe line to said piston to move it into and out of engagement with said cam means in accordance with the energised and de-energised state of an energising circuit of said solenoid, and said means responsive to the extent of movement of said movable element comprises an electric limit switch connected in said energising circuit.

References Cited by the Examiner

UNITED STATES PATENTS

| | | | |
|---|---|---|---|
| 2,252,482 | 8/1941 | Gates | 60—54.5 |
| 2,270,585 | 1/1942 | Gartner | 60—54.5 |
| 2,270,586 | 1/1942 | Jahant et al. | 60—54.5 |
| 2,289,145 | 7/1942 | Saives | 60—54.5 |
| 2,483,205 | 9/1949 | Jones | 188—85 |
| 2,906,376 | 9/1959 | Zeigler | 188—85 |
| 3,089,734 | 5/1963 | Jankus | 303—21 |

FOREIGN PATENTS

| | | |
|---|---|---|
| 567,153 | 12/1923 | France. |
| 973,544 | 9/1950 | France. |

EUGENE G. BOTZ, *Primary Examiner.*

ROBERT R. BUNEVICH, *Examiner.*